United States Patent [19]

Shen et al.

[11] Patent Number: 5,091,089
[45] Date of Patent: Feb. 25, 1992

[54] MICROBIAL DECOLORIZATION OF WASTEWATER

[75] Inventors: Hwei-Ping Shen; Duen-Gang Mou; Kim-Kee Lim; Paul Feng; Chun-Hwei Chen, all of Taipei, Taiwan

[73] Assignee: Development Center for Biotechnology, Taipei, Taiwan

[21] Appl. No.: 578,226

[22] Filed: Sep. 6, 1990

[51] Int. Cl.$^5$ ............................................... C02F 3/34
[52] U.S. Cl. ................................... 210/611; 210/909; 210/917; 435/263; 435/911
[58] Field of Search ............... 210/611, 908, 909, 917, 210/928, 610; 435/262, 263, 911

[56] References Cited

U.S. PATENT DOCUMENTS

| | | | |
|---|---|---|---|
| 4,554,075 | 11/1985 | Chang et al. | 210/909 |
| 4,655,926 | 4/1987 | Chang et al. | 210/928 |
| 4,692,413 | 9/1987 | Farrell | 210/606 |
| 4,891,320 | 1/1990 | Aust et al. | 210/611 |

Primary Examiner—Thomas Wyse
Attorney, Agent, or Firm—Birch, Stewart, Kolasch & Birch

[57] ABSTRACT

Present invention offers, for the first time, a biological approach through the use of white-rot fungi to the decolorization of dye wastewater. It is also applicable to other colored substances and/or their wastewater such as molasses. Because of its low cost, renewable and regenerative activity, and little or no secondary pollution hazard, biological method is the most widely practiced method in nature and in practice in treating organic refuse and industrial waste. Current invention discloses, specifically, undiscovered activities of the Myrothecium and Ganoderma fungi in removing colored substances from dye solutions and dye wastewater. It is the result of a deliberate process of screening for natural water/soil-born and farm/industrial-waste-derived microorganisms for such specific purpose in our laboratory.

The accompanied process invention shows that simple biological treatment could also produce consistently effective results in treating a wide spectrum of dye wastewater under greatly varied conditions. This ability also is not restricted to the dye substances. For instance, it was also effective in decolorizing molasses fermentation wastewater. Since Ganoderma fungi is a well consumed fungi in the Orient particularly for its medicinal value, we have reason to believe that this color transforming and/or removing ability has great potential in facilitating the manufacturing of specialty food and drug products where color may present certain unique consideration.

20 Claims, No Drawings

MICROBIAL DECOLORIZATION OF WASTEWATER

FIELD OF THE INVENTION

The present invention relates to microbial decolorization of wastewater, and in particular to decolorization of dye molecules or dye-containing wastewater by white-rot fungi, or even more specifically, by species belonging to the Myrothecium or Ganoderma genus. The above was accomplished through a mechanism of dye adsorption, and in certain cases, followed by microbial dye degradation.

BACKGROUND OF THE INVENTION

In addition to biological treatment, physical and chemical methods are also used for removal of colored dye substances in wastewater (Groff and Kim, 1989). In fact, the latter two have been more widely adopted for their effectiveness. Chemical methods often involve coagulation of dye substances followed by precipitation of the chemical sludge or oxidation process using ozone. Physical methods involve mainly adsorption by activated carbon or its like. In hybrid physical/chemical or physical/biological processes, ionizing irradiation and ultrafiltration are useful methods of pretreatment. Nevertheless, both physical and chemical methods have their shortcomings. Coagulation produces excess amount of chemical sludge and creates problem of its disposal. Oxidation employs costly ozone and is not effective for reductive or sulphur dye wastewater. Activated carbon also incurs high operating expenses and additional capital on activity regeneration. These are obvious opportunities and challenges for biological treatment method to offer viable alternatives in treating dye-containing wastewater.

Bio-decolorization of lignin-containing pulp and paper wastewater using white-rot fungi Phanerochaete Chrysosporium and Tinctporia sp. (Eaton, et al., 1980; Fukuzumi, et al., 1980) were clear examples of color removal thru microbial degradation of the colored substance, i.e., highly chlorinated and oxidized polymeric lignin molecules. Similar observation was reported later using another white-rot fungus *Schizophyllum commune* to decolorize wastewater from a bagasse pulping plant (Belsare, et al., 1988). As for dye color removal, a recent review (Groff and kim, 1989) described the ability of Rhodococcus, *Bacillus cereus* and Plesiomonas/Achromobacter to degrade soluble dyes, acid red dye and five azo-dyes, respectively. The widely practiced biological activated sludge method may be useful in removing COD and BOD in dye wastewater. They found little information concerning its effectiveness in dye color removal. On the other hand, textile dyes were found strongly adsorbed and held by wastewater treatment plant sludges that were landfilled. This suggests that adsorption may play another key role in biodecolorization.

Molasses wastewater may present an even tougher color removal task. One culture possessing this ability was found belonging to the Basidiomycetes family (Hongo, et al., 1973). Further screening utilizing melanoidin, the major colored substance in molasses, isolated Coriolus sp. 20 and found its color removing activity may be associated with the enzyme sorbose oxidase (Watanabe, et al., 1982). Subsequent investigation by Ohmomo, et al., at University of Tsukuba, Japan, yielded *Coriolus versicolor* Ps4a (Ohmomo, et al., 1985), *Mycelia sterilia* D90, *Aspergillus fumigatus* G-2-6, *A. oryzae* Y-2-32, and *Lactobacillus hilgaridii* W-NS, all found capable in decolorizing molasses.

Above reviewed bio-decolorization reports limit their studies primarily in defined laboratory model systems. Their actual application and effectiveness toward colored high strength industrial wastewater were not particularly emphasized. Though limited, successful examples of bio-decolorization of pulp and paper wastewater (U.S. Pat. No. 4,655,926, Chang, et al., 1987) and molasses wastewater (Sirianuntapiboon, et al., 1988) were reported. The former demonstrated the use of a rotating biological contacter and strains of white-rot fungi to remove color in waste liquor without giving quantitative results. While the latter claimed color removal of 40 percent or higher.

SUMMARY OF THE INVENTION

Present invention offers, for the first time, a biological approach thru the use of white-rot fungi to the decolorization of dye wastewater. It is also applicable to other colored substances and/or their wastewater such as molasses. Because of its low cost, renewable and regenerative activity, and little or no secondary pollution hazard, biological method is the most widely practiced method in nature and in practice in treating organic refuse and industrial waste. Current invention discloses, specifically, undiscovered activities of the Myrothecium and Ganoderma fungi in removing colored substances from dye solutions and dye wastewater. It is the result of a deliberate process of screening for natural water/soil-born and farm/industrial-waste-derived microorganisms for such specific purpose in our laboratory.

The accompanied process invention shows that simple biological treatment could also produce consistently effective results in treating a wide spectrum of dye wastewater under greatly varied conditions. This ability also is not restricted to the dye substances. For instance, it was also effective in decolorizing molasses fermentation wastewater. Since Ganoderma fungi is a well consumed fungi in the Orient particularly for its medicinal value, we have reason to believe that this color transforming and/or removing ability has great potential in facilitating the manufacturing of specialty food and drug products where color may present certain unique consideration.

DETAILED DESCRIPTION OF THE PRESENT INVENTION

Process of present invention is as follows:

I. Source of Wild Type Cultures

1. Soil from the farms and pastures of National Taiwan University in the vicinity of DCB—64 strains
2. Long chain dicarboxylic-acid-producing culture—74 strains
3. Pig excrement—168 strains
4. Wastewater from Taiwan Sugar Corporation—27 strains
5. Wastwater from China Chemical Corporation—3 strains
6. Wastwater from the alcohol fermentation factory of Taiwan Sugar Corporation—7 strains
7. Dye wastewater—13 strains The total number of strains is 419.

II. Isolation of Dye Degrading Microorganism

Nutrient agar (NA) and potato dextrose agar (PDA) petri plates supplemented with each of the three dyes molecules listed below were used to screen soil and wastewater samples for colonies circled by a clear decolorized zone. This procedure followed standard microbiology practices. Antibiotics were added to PDA to discourage bacteria growth.

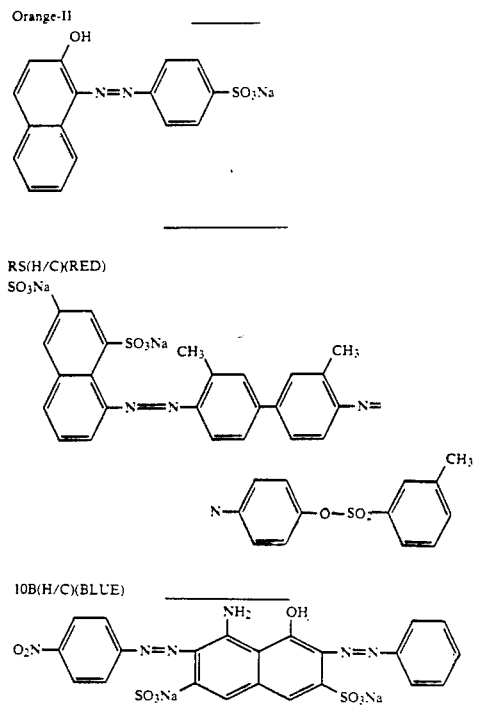

Further confirmation used the following dye/media combinations:

| Solution of dyes (100 mg/L) | Nutrient W/2% agar |
|---|---|
| Orange-II | 0.1% glucose 0.1% peptone |
| Orange-II | None |
| RS | 0.1% glucose 0.1% peptone |
| RS | None |
| 10B | 0.1% glucose 0.1% peptone |
| 10B | None |

Colonies so isolated were then tested for dye decolorization under submerged culture condition at near ambient temperature for up to two weeks. One spore-forming filamentous fungus, suspected of the white-rot type, showed consistent ability in clearing dye color ($10^2$ mg/L solution) to a degree not detectable by naked eyes. The reaction could take place over wide pH range and static incubation condition. In addition, the culture propagates rapidly with simple growth requirement.

For its availability in our lab, Ganoderma species from the Culture Collection & Research Center (CCRC) of the Republic of China were also included in this dye decolorization screen. Their ability to remove dye color was confirmed soon after the identification of the unknown isolate.

III. Decolorization of Target Dyes with Resting Cells

The simplest way to carry out the decolorization study was to grow the culture first in potato dextrose broth (PDB) to sufficiently high density. After centrifugation of the culture broth, packed wet cell cake was then removed, weighed and mixed with constant volume of various dye-containing sample solutions for the resting cells experiments.

Degree of decolorization was quantified by measuring reduction of optical density (OD) at characteristic wavelength of each dye materials or samples. It is the wavelength having maximum light absorbency over a full visible spectrum scan. Due to the high CD of untreated samples, standard procedure in sample dilution was followed in observing Beer-Lambert law. The OD of untreated blank controls were corrected for dilution by adding water equal to that trapped in the cell cake. During experiment, they were kept in closed containers under refrigerated temperature.

IV. Culture Identification

From the observation of the growth of cells and the size, shape, color and texture of the spores engendered therefrom, and with reference to published reports and papers (Preston, 1943), the isolate is identified as *Myrothecium verrucaria* DCB D-1. *M. verrucaria* CCRC 31545 (ATCC 9095) obtained from CCRC has growth and spore morphology identical to those of DCB D-1. Further experiments (the same method as in example 1) porved that *M. verrucaria* 31545 and ATCC 36315 also posses dye color removing capability:

| Strains | Percentage of Color Removal | | |
|---|---|---|---|
| | RS | 10B | Orange-II |
| DCB D-1 | 98.9 | 97.6 | 70.1 |
| ATCC 9095 (CCRC 31545) | 96.6 | 94.5 | 63.4 |
| ATCC 36315 | 99.1 | 98.9 | 91.2 |

From these results, our unknown isolate which possesses the novel dye-removal capability was identified as *M. verrucaria* DCB D-1. It is also known from published reports and papers that this fungal species produces strong cellulase activity (Herr, Luck and Dellweg, 1978; Hulme and Stranks, 1971) and synthesizes macrocyclic trichothecene (Jarvis, et al., 1984; Smitka, et al., 1984; Jarvis and Mazzola, 1980).

Having identified this filamentous fungus, other fungi belong to the same genus and other genuses of the white-rot fungi type deserved further examination. Hence, the Ganoderma species were tested and, subsequently, confirmed to possess similar color removing ability as *M. verrucaria* DCB D-1 (see example 8). We therefore conclude that this dye adsorption and degradation activity is not limited to the Myrothecium and Ganoderma genuses. It could be a novel characteristic widely possessed by the white-rot fungi.

V. Examples

Examples of decolorization of dye solutions and dye wastewater using the present invention are described in detail as follows:

Example 1

Color removal by *M. verrucaria* DCB D-1 on the three dye mentioned above

Dye solutions had the following properties:

| Dyes | (RS) | (10B) | (Orange-II) |
|---|---|---|---|
| Color | red | blue | orange |
| PH value | 7.0 | 6.7 | 6.4 |
| Light absorbing wavelength (nm) | 510 | 620 | 485 |
| Concentration of solution | 0.25 g/L | 0.2 g/L | 0.24 g/L |

Three-day-old shake flask cultured *M. verrucaria* DCB D-1 cells (in PDB) were harvested by centrifugation. Mixed cells (water content: 98.5%) and dye solution in a conical flask with a weight ratio of 1:3. Allowed the flask to stand for 1 day at a temperature of 28° C. before measuring the O.D. value of the supernatants. As for the control group, use the same amount of distilled water in place of the cells. The degree of decolorization (%)=[(O.D. bdfore treatment - O.D. after treatment)/O.D. before treatment]×100%. Results were recorded as follows:

| Dye | (RS) | (10B) | (Orange-II) |
|---|---|---|---|
| O.D. before treatment | 5.64 | 6.02 | 8.96 |
| O.D. after treatment | 0.101 | 0.451 | 3.03 |
| percentage of color removal | 98.2 | 92.5 | 66.2 |

This decolorization experiment was repeated and results showed good reproducibility:

| (Experiments) | (Percentage of decolorization) | | |
|---|---|---|---|
| | RS | 10B | Orange-II |
| 1 | 98.2 | 92.5 | 66.2 |
| 2 | 98.9 | 97.6 | 70.1 |

HPLC method was also developed to quantify the rate of dye removal. Since its results showed linear correspondence with the O.D. measurements, we adopted the simpler O.D. method for quantification of dye removal. Through visual inspection, one saw that the cells adsorbed the dye color first as indicated by the quickly colored filamentous mass. The cell bound color then gradually degraded, depending on types of the dye molecules, over a period of a week or longer. Afterwards, the filamentous mass regained its pale white color.

Higher dye concentration did not hinder color removal and prolonged contact between dye and cells produced greater OD reduction.

Example 2

Treating dye wastewater samples from a textile dyeing factory

Samples

I: basic dye residual solution from yarn dyeing
II: direct dye residual solution from yarn dyeing
III: T/R oxidative desizing and disperse dye residual solution from yarn dyeing
IV: reactive dye residual solution
V: Neolan acid dye residual solution
VI: sulphide: reactive/vat dye=1:4

All six samples had wide pH variations and high chloride ion concentration-some as high as 15% (W/V) and their general properties were as follows:

| Wastewater | I | II | III | IV | V | VI |
|---|---|---|---|---|---|---|
| PH value | 4.48 | 9.8 | 8.2 | 11 | 9.3 | 10.2 |
| Light absorbing wavelength (nm) | 567 | 496 | 467 | 439 | 565 | 600 |

3-5 days old *M. verrucaria* DCB D-1 in PDB shaker culture were harvested by centrifugation. They were mixed with the wastewater samples in different weight: volume proportions as follows. Separate sets of the same preparation without cells were kept.

| Samples | I | II | III | IV | V | VI |
|---|---|---|---|---|---|---|
| Cell/Dye solution | 1:3 | 1:2.5 | 1:2.5 | 1:1.67 | 1:2.67 | 1:2.2 |

Both sets were incubated at 28° C. for 1 to 2 weeks. Results of O.D. removed according to their light absorbing wavelengths were:

| Samples | I | II | III | IV | V | VI |
|---|---|---|---|---|---|---|
| Percentage of color removal | 93% | 98% | 78% | 81% | 43% | 84% |
| Final pH value | 4.0 | 4.6 | 4.8 | 8.4 | 3.6 | 4.7 |

Visual observation was also recorded:

Samples

I: purplish blue→light pink→color is decomposed by cells and wastewater became colorless
II: reddish black→color is adsorbed by cells and wastwater became colorless
III: black→color is adsorbed by cells and wastewater became colorless
IV: reddish black→color is adsorbed by cells and wastewater became colorless
V: crimson red→color is adsorbed by cells and wastewater became pink
VI: black→color is adsorbed by cells and wastewater became almost colorless Example 3

Treating dye wastewater samples from a dye maunfacturing plant
Sample I: mixed liquor containing reactive, direct, acid and other high class dye residues, pH 8.5
Samples II: reactive red-dye-containing waste liquor, pH 8.3

Equal weight of the newly isolated bioagent and fresh aeration pond activated sludge (from the plant site) were each mixed with same weight of raw or 1:1 diluted dye wastewater and incubated for 2 weeks. The activated sludge test was under constant aeration, while the new isolate used the usual static incubation (same as example 2).

| Method Used | Sample I | Sample II |
|---|---|---|
| | (% OD Reduction) | |
| Act. Sludge | 3 (pH 8.0) | 7 (pH 8.3) |
| This Study + 1× Waste Liquor | 30 | 37 |
| This Study + | 94 | 60 |

-continued

| Method Used | Sample I | Sample II |
|---|---|---|
| | (% OD Reduction) | |
| 0.5× Waste Liquor | | |

It is evident that the new fungal isolate is far more effective than activated sludge in removing dye color from the wastewater.

Visual inspection yielded the following observation:
1. Activated sludge process:
No obvious changes-wastewater was still reddish brown.
2. Present invention:
Color is decomposed by mycelia and wastewater showed obvious color reduction.

Example 4

Molasses fermentation wastewater from monosodium glutamate factory.

M. verrucaria DCB D-1 cells were added the same way as in previous examples to wastewater at a weight-:volume ratio of 1:1. They were incubated at 28° C. Control sample without added cells was stored in the refrigerator. After two weeks, O.D. values between sample and control sets were compared at 475 nm.

After treatment, pH changed from the initial 7.3 to 3.7, and the color removal percentage was 41%. Similar results were also obtained in treating molasses fermentation wastewater from the alcohol distillery.

Example 5

Use of heat inactivated cells

Example 1 was repeated once more using RS dye and 5-day static incubation to compare the color removal ability between freshly grown vegetative cells and 10 min autoclaved cells. Much to our surprise that autoclaved cells were equally effective in decolorizing the dye solution:

| (Treatments) | (% of color removal) |
|---|---|
| No heat treatment | 96.5 |
| 80° C. for 10 min | 98.4 |
| 100° C. for 20 min | 94.4 |
| Autoclave at 121° C. for 10 min | 94.9 |

One can view this as a strong indication of adsorption over degradeation as the primary mechanism of color removal.

Example 6

Effect of shaking

Example 1 was repeated to compare results between static and shaker (175 rpm) incubation. Results after 48-hr were as follows

| | % O D Reduction | |
|---|---|---|
| Dyes | Static | Shaking |
| RS | 96.5 | 93.8 |
| 10B | 99.5 | 90.3 |
| Orange-II | 71.5 | 61.7 |

The data clearly shows that there is no advantage in shaking and/or aeration during the bio-decolorization process. There might even be some adverse effect as the data show.

Example 7

The color removing ability of various myrothecium species

To determine the decolorizing effect of different Myrothecium species, Example 1 was repeated execpt that the mixtures were allowed to stand for 2 days, for various Myrothecium species:

| | | Percentage of color removal | | |
|---|---|---|---|---|
| Cultures | ATCC No. | RS | 10B | Orange-II |
| M. verrucaria | (DCB D-1) | 98.9 | 97.6 | 70.1 |
| | 9095(CCRC31545) | 96.6 | 94.5 | 63.4 |
| | 36315 | 99.1 | 98.9 | 91.2 |
| M. prestonii | 24427 | 99.4 | 97.0 | 91.6 |
| M. leucotrichum | 16686 | 93.7 | 87.1 | 58.0 |
| M. sp | 13667 | 87.9 | 89.8 | — |
| M. pnicilloides | 56896 | 91.5 | — | — |
| M. masonii | 24426 | 89.9 | 90.8 | — |
| M. striatisporum | 18947 | 97.3 | 98.9 | — |
| M. roridum | 16297 | 81.1 | 91.5 | 38.3 |
| M. cinctum | 22270 | 86.5 | 58.8 | 25.5 |

( — missing figures were due to insufficient cell growth.)

Above results reveal that, in addition to M. verrucaria strains, other Myrothecium cultures also possess the capacity for dye decolorization. Moreover, the decolorization effect is wide spread and consistent.

Example 8

The color removing ability of various ganoderma species

Both Ganoderma and Myrothecium are filamentous fungi and possess the characteristic ability of decomposing wood-the white-rot type. Therefore, in addition to Myrothecium, Ganoderma species were also chosen to determine their capacity for dye decolorization.

Ganoderma cells were grown in PDB shaker culture for 7-14 days. Afterward, experiment followed the steps decribed in Example 1, except that the mixtures were allowed to stand for 2 days.

| | | Percentage of color removal | | |
|---|---|---|---|---|
| Culture | CCRC No. | RS | 10B | Orange-II |
| G. applanatum | 36066 | 87.5 | 68.1 | 41.4 |
| | 36097 | 90.9 | 81.8 | — |
| | 36088 | 93.0 | 90.4 | — |
| | 36113 | 83.6 | — | — |
| | 36128 | 87.6 | 81.1 | — |
| | 36156 | 80.0 | 78.1 | — |
| G. lucidum | 36143 | 90.8 | 90.8 | — |
| | 36123 | 90.5 | 85.8 | 58.2 |
| | 36021 | 95.8 | 78.8 | 33.0 |
| G. subamboinense var. laevisporum | 36087 | 94.0 | 81.6 | 40.2 |
| G. oerstenii | 36293 | 95.2 | 94.0 | — |
| G. sessile | 37028 | 93.3 | — | — |
| G. tropicun | 37026 | 93.5 | 78.2 | 45.2 |
| | 36041 | 89.1 | 77.3 | 28.4 |
| | 37029 | 91.5 | 94.4 | 51.7 |
| G. resinaceum | 36147 | 97.5 | 94.3 | — |
| | 36149 | 89.6 | 87.2 | — |
| G. weberianum | 36145 | 95.6 | 93.1 | 77.2 |
| G. colossus | 36157 | 96.5 | 92.0 | — |
| G. sp | 36066 | 91.1 | 86.8 | 42.3 |
| Under Identification | 37054 | 91.3 | 87.4 | — |
| | 37049 | 93.0 | 88.2 | 64.3 |
| | 37033 | 93.0 | — | — |
| | 37053 | 96.1 | 94.7 | — |

( — missing figures were due to insufficient cell growth.)

Example 9

Kinetics of dye adsorption by *M. verrucaria* DCB D-1

The resting cell experiment in Example 1 was repeated using RS dye and sampled 5 minutes after addition of cells and every 2 hours thereafter. Based on O.D. readings, more than 50% of the dye were removed in the first few minutes after contact. Equilibrium for OD reduction was reached in about 10 hours To probe the limit of dye adsorption/degradation by the mycelial mass, four additional shots of dye solution, each contained the same amount of dye as the initial shot, were added to the resting cell culture in 24 hours intervals. Samples were taken 1 minute and 24 hours after each shot and their OD values measured. After adding all five shots together, we found that 1 kg of wet mycelial cells could remove close to 4 g of RS dye molecules.

Present invention indicates that microbial decolorization could be a viable means in ridding dye wastewater its color related problem. Dye molecule adsorption onto cell surface appears to be a quick process and often completes in a matter of hours. This does not seem to be a specific process—acid, basic, direct, reactive, disperse dyes could all be cleared out of solution using the same approach. There is no specific nutrient requirement and is insensitivity to high salt concentration or wide variation in pH. Once it became clear that even autoclaved cells could pick up dye color the same way as vegetative cells, one is less surprised at the fact that static incubation of dye and cells alone can produce the desired result. Incubation of resting (non-autoclaved) cells beyond the dye adsorption stage resulted in visual disappearance of cell bound color in about a week time for certain dyes. For others, cell bound dye did not disappear even after one month.

The above described examples have discolsed the proper steps and necessary conditions in applying the present invention. Although specific steps and conditions are applied in the examples, the purpose is to give a comprehensive and descriptive illustration. Therefore, the scope of the present invention should not be limited to such illustration.

We claim:

1. A process for decolorizing dye-containing wastewater, comprising adding white-rot fungi to said wastewater so as to absorb, degrade, or remove the color or optical density of said wastewater.

2. The process of claim 1, wherein said white-rot fungi are selected from the group consisting of the genus Myrothecium and the genus Ganoderma.

3. The process of claim 2, wherein said white-rot fungi of the genus Myrothecium are selected from the group consisting of *M. verrucaria* DCB D-1, ATTC 9095 (CCRC 31545), ATCC 36315, *M. prestonii* ATCC 24427, *M. leucotrichum* ATCC 16686, M. sp. ATCC 13667, *M. penicilloides* ATCC 56896, *M. masonii*, ATCC 24426, *M. striatisporum* ATCC 18947, *M. roridum* ATCC 16297, and *M. cinctum* ATCC 22270.

4. The process of claim 2, wherein said white-rot fungi of the genus Ganoderma are selected from the group consisting of *G. applanatum*, CCRC 36066, 36097, 36088, 36113, 36128, 36156, *G. lucidum* CCRC 36143, 36123, 36021, *G. subamboinese var. laevisporum* CCRC 36087, *G. oerstenii* CCRC 36293, *G. sessile* CCRC 37028, *G. tropicun* CCRC 37026, 36041, 37029, *G. resinaceum* CCRC 36147, 36149, *G. weberianum* CCRC 36145, *G. colossus* CCRC 36157, and Ganoderma sp. CCRC 36066, 37054, 37049, 37033, and 37053.

5. The process of claim 1, wherein said wastewater is dye wastewater.

6. The process of claim 5, wherein said dye wastewater contains a dye selected from the group consisting of textile dyes, acid dyes, basic dyes, direct dyes, reactive dyes, disperse dyes, and mixtures thereof.

7. The process of claim 6, wherein said textile dyes are selected from the group consisting of RS, 10B, and Orange II.

8. The process of claim 1, wherein said white-rot fungi are cultured in media selected from the group consisting of PDB, cellulose-containing media, molasses-containing media, starchcontaining media, sugar-containing media, glucose-containing media, and other carbon-containing media prior to addition to said wastewater.

9. The process of claim 1, wherein said white-rot fungi are added to said wastewater as a pure, mixed, or enriched culture.

10. The process of claim 1, wherein said white-rot fungi are added to said wastewater in a form selected from the group consisting of cells, their enzymes, their culture broth, and their supernatant.

11. The process of claim 10, wherein said cells are spherical or filamentous, dead or alive, added singly, or in combination with other cells.

12. The process of claim 11, wherein said dead cells are heat-inactivated cells.

13. The process of claim 11, wherein said cells are employed either as a suspension or in immobilized form.

14. The process of claim 13, wherein said cells in suspension are employed as either a static or shake culture.

15. The process of claim 1, wherein the pH of said wastewater is between 2 and 12.

16. The process of claim 1, wherein no nutrients are added to said wastewater during the incubation of said white-rot fungi in said wastewater.

17. The process of claim 1, wherein a suitable amount of oxygen and nutrients are added to said wastewater to encourage the regeneration of cell activity of said white-rot fungi.

18. The process of claim 1, wherein said white-rot fungi are incubated in said wastewater at 28° C. for one to two weeks.

19. The process of claim 1, wherein one kg of wet mycelial cells of said white-rot fungi is effective in removing close to 4 g of dye.

20. The process of claim 1, wherein said white-rot fungi are effective in removing from 28.4 percent to 99.5 percent of the color of said wastewater as measured by the change in optical density before and after incubation with said white-rot fungi.

* * * * *